(12) United States Patent
Ren et al.

(10) Patent No.: US 12,506,963 B2
(45) Date of Patent: Dec. 23, 2025

(54) ANTI-SHAKE MECHANISM AND CAMERA MODULE

(71) Applicant: AAC Microtech (Changzhou) Co., Ltd., Jiangsu (CN)

(72) Inventors: Zhang Ren, Changzhou (CN); Yun Tang, Changzhou (CN); Wei Song, Changzhou (CN); Suntong Zhou, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 62 days.

(21) Appl. No.: 18/741,817

(22) Filed: Jun. 13, 2024

(65) Prior Publication Data

US 2025/0254427 A1    Aug. 7, 2025

Related U.S. Application Data

(63) Continuation of application No. PCT/CN2024/076049, filed on Feb. 5, 2024.

(51) Int. Cl.
*H04N 23/68* (2023.01)
*H04N 23/51* (2023.01)

(52) U.S. Cl.
CPC ........... *H04N 23/685* (2023.01); *H04N 23/51* (2023.01)

(58) Field of Classification Search
CPC .............................. H04N 23/51; H04N 23/685
See application file for complete search history.

(56) References Cited

U.S. PATENT DOCUMENTS

| | | | |
|---|---|---|---|
| 12,066,744 B2* | 8/2024 | Jung | G03B 30/00 |
| 2018/0288299 A1* | 10/2018 | Wada | H04N 23/6812 |
| 2018/0364445 A1* | 12/2018 | Osaka | H04N 23/54 |
| 2022/0337753 A1* | 10/2022 | Oh | H04N 23/51 |
| 2024/0048846 A1* | 2/2024 | Yang | G03B 5/06 |
| 2024/0243647 A1* | 7/2024 | Lee | H04N 23/57 |

* cited by examiner

*Primary Examiner* — Amy R Hsu
(74) *Attorney, Agent, or Firm* — Wiersch Law Group

(57) ABSTRACT

The present application provides an anti-shake mechanism and a camera module, and the anti-shake mechanism includes an anti-shake circuit board and a flexible sheet arranged on the outside of the anti-shake circuit board. The anti-shake circuit board and the flexible sheet are partially overlapped, and the flexible sheet has an asymmetric structure. The flexible sheet includes a first main body and a first folded edge, and the anti-shake circuit board includes a second main body, a second folded edge, and an electrical connection portion. The second folded edge is provided in correspondence with a part of the first folded edge, a stiffness compensation structure is provided, and a connecting region between the first folded edge and the second folded edge is at least partially adherent. The anti-shake mechanism optimizes the structures, improves the overall structural stability, reduces the production cost, and improves the optical anti-shake performance.

11 Claims, 8 Drawing Sheets

ANTI-SHAKE MECHANISM AND CAMERA MODULE

CROSS-REFERENCE TO RELATED APPLICATIONS

This application is a continuation of International Application No. PCT/CN2024/076049, filed Feb. 5, 2024, the entire contents of which are incorporated herein by reference.

TECHNICAL FIELD

The present application relates to the technical field of optical imaging, in particular to an anti-shake mechanism and a camera module.

BACKGROUND

The camera module in the related art assists users in obtaining clear images through an anti-shake mechanism. The physical driving methods for camera modules generally include spring-type, ball-type, and memory alloy-type mechanisms. However, in the anti-shake mechanisms of the related art, there are anti-shake circuit boards and flexible connection boards. The active edge of the anti-shake circuit board is usually formed by stacking multiple layers of boards, and the active edge of the flexible connection board is often formed using etching processes. This results in high production costs and poor overall structural rigidity of the anti-shake mechanism, making it susceptible to rigid pulling forces. Consequently, the overall stability of the camera module is reduced, which in turn lowers the adjustment accuracy of the camera module.

Therefore, it is necessary to provide an anti-shake mechanism and a camera module with good structural stability, low production cost, and better optical anti-shake performance.

SUMMARY

An object of the present application is to provide an anti-shake mechanism and a camera module. The anti-shake mechanism has good overall structural stability, low production costs, and excellent optical stabilization performance.

The technical solution of the present application is as follows.

In a first aspect, the present application provides an anti-shake mechanism, comprising:
  an anti-shake circuit board comprising:
    a second main body;
    a second folded edge arranged circumferentially around the second main body; and
    an electrical connection portion provided on the second folded edge; and
  a flexible sheet arranged outside the anti-shake circuit board, the anti-shake circuit board and the flexible sheet partially overlapping each other, the flexible sheet being of an asymmetric structure; the flexible sheet comprising:
    a first main body; and
    a first folded edge arranged circumferentially around the first main body;
  wherein the first folded edge is arranged perpendicular to a plane of the first main body; the second folded edge is provided in correspondence with a part of the first folded edge; a stiffness compensation structure is provided on a region where the first folded edge is not connected to the second folded edge, and a connecting region between the first folded edge and the second folded edge is at least partially adherent.

In one embodiment, a gap is provided between the connecting region between the first folded edge and the second folded edge, and the gap is at least partially filled with a flexible connection structure.

In one embodiment, the gap is entirely filled with a flexible connecting structure; or, the gap is provided with a plurality of flexible connecting structures spaced apart, and the flexible connecting structures are uniformly distributed within the gap.

In one embodiment, the flexible sheet further comprises first connecting blocks, the first connecting blocks being symmetrically arranged on both sides of the first main body and connected to the first folded edge; the anti-shake circuit board further comprises second connecting blocks, the second connecting block being symmetrically arranged on both sides of the second main body and connected to the second folded edge; the first connecting blocks the second connecting blocks are provided correspondingly.

In one embodiment, each of the first connecting blocks comprises a first connecting portion connected to the first main body and second connecting portions connected to the first folded edge; the second connecting portions are symmetrically arranged on both sides of the first connecting portion, and separate the first folded edge to form a first segment and a second segment; a first notch is formed in a spacing between the first segment and the second segment; the second folded edge is connected to the first segment; a second notch is provided on a region of the first segment corresponding to the electrical connection portion, and a third notch is provided on a region of the second segment corresponding to the second notch.

In one embodiment, the stiffness compensation structure is provided on a region of the first main body away from the second folded edge, or on the second segment.

In one embodiment, the stiffness compensation structure is a first thickening structure arranged on an inner and/or outer side of the second segment; or, the stiffness compensation structure is a thickening structure arranged on an upper surface and/or a lower surface of the second segment; or, the stiffness compensation structure is a second thickening structure arranged on a lower surface of a region of the first main body away from the second folded edge.

In one embodiment, an end portion of the second notch is extended outwardly to form third folded edges arranged parallel to the first main body; the third folded edges are connected to each other through a first connecting piece, and the electrical connection portion is connected to an upside of the first connecting piece; an end portion of the third notch is extended outwardly to form fourth folded edges arranged parallel to the first main body, and the fourth folded edge connected to each other through a second connecting piece.

In one embodiment, the anti-shake mechanism further comprises an anti-shake bracket, a base plate, anti-shake coils, anti-shake magnetic steels, and a casing; wherein the anti-shake bracket is arranged in a region enclosed by the anti-shake circuit board and the flexible sheet; the flexible sheet is supported on the base plate, and the anti-shake coils are distributed circumferentially around the anti-shake bracket; the anti-shake magnetic steels are arranged above the corresponding anti-shake coils, and the casing and the base plate together form an accommodating space for accommodating the anti-shake circuit board, the flexible sheet, the anti-shake bracket, the anti-shake coils, and the anti-shake magnetic steels.

In one embodiment, a spacer is provided between the base plate and the flexible sheet, and the flexible sheet is connected to the spacer; the anti-shake bracket is connected to the anti-shake circuit board, and the anti-shake bracket comprises a connecting ring arranged in a square shape, a first connecting arm arranged at a corner region of the connecting ring, and second connecting arms arranged symmetrically on both sides of the connecting ring; each of the second connecting arms is provided with connecting lugs connected to an inner wall of the first folded edge and an inner wall of the second folded edge; and the spacer is connected to a bottom side of the first connecting piece and a bottom side of the second connecting piece.

In a second aspect, the present application provides a camera module, comprising an anti-shake mechanism as described above and an image-sensing assembly, wherein the image-sensing assembly is arranged in a region enclosed by the anti-shake circuit board and the anti-shake bracket.

The beneficial effect of the present application is as follows.

The anti-shake mechanism of the present application includes an anti-shake circuit board and a flexible sheet, and the anti-shake circuit board and the flexible sheet are partially overlapped, which reduces the volume of the anti-shake circuit board, and then the flexible sheet is arranged as an asymmetric structure, and through the structural optimization of the anti-shake circuit board and the flexible sheet are structurally optimized, thereby ensuring the electrical connection role of the anti-shake circuit board while simultaneously adjusting and optimizing the optical anti-shake performance;

The first folded edge and the second folded edge are arranged vertically relative to a plane of the first main body and a plane of the second main body, respectively. The first folded edge and the second folded edge are arranged in a three-dimensional folding structure, thereby saving the etching process, simplifying the process of preparing parts, improving assembly efficiency, and reducing production costs. Besides, the folded edge structure of the flexible sheet and the folded edge structure of the anti-shake circuit board are arranged to meet the rigidity requirements in the x-direction, y-direction, and y-direction of the anti-shake circuit board and ensure that the stable support of the z-axis while guaranteeing the anti-shake stability in the x- and y-directions.

Figure 1:
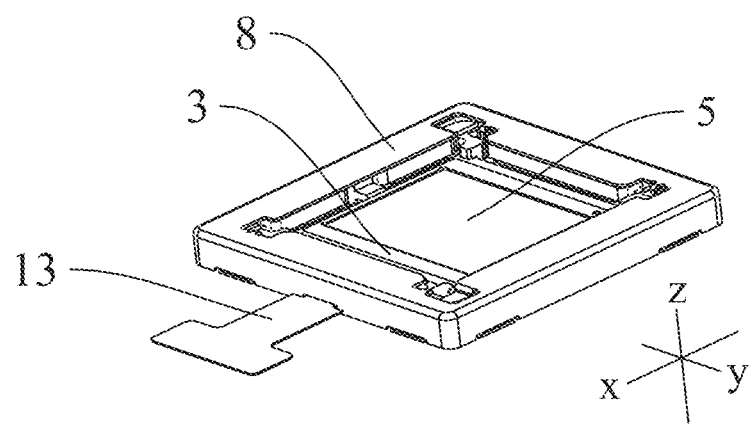
FIG. 1 shows a structural schematic diagram of an anti-shake mechanism of the present application.
Figure 2:
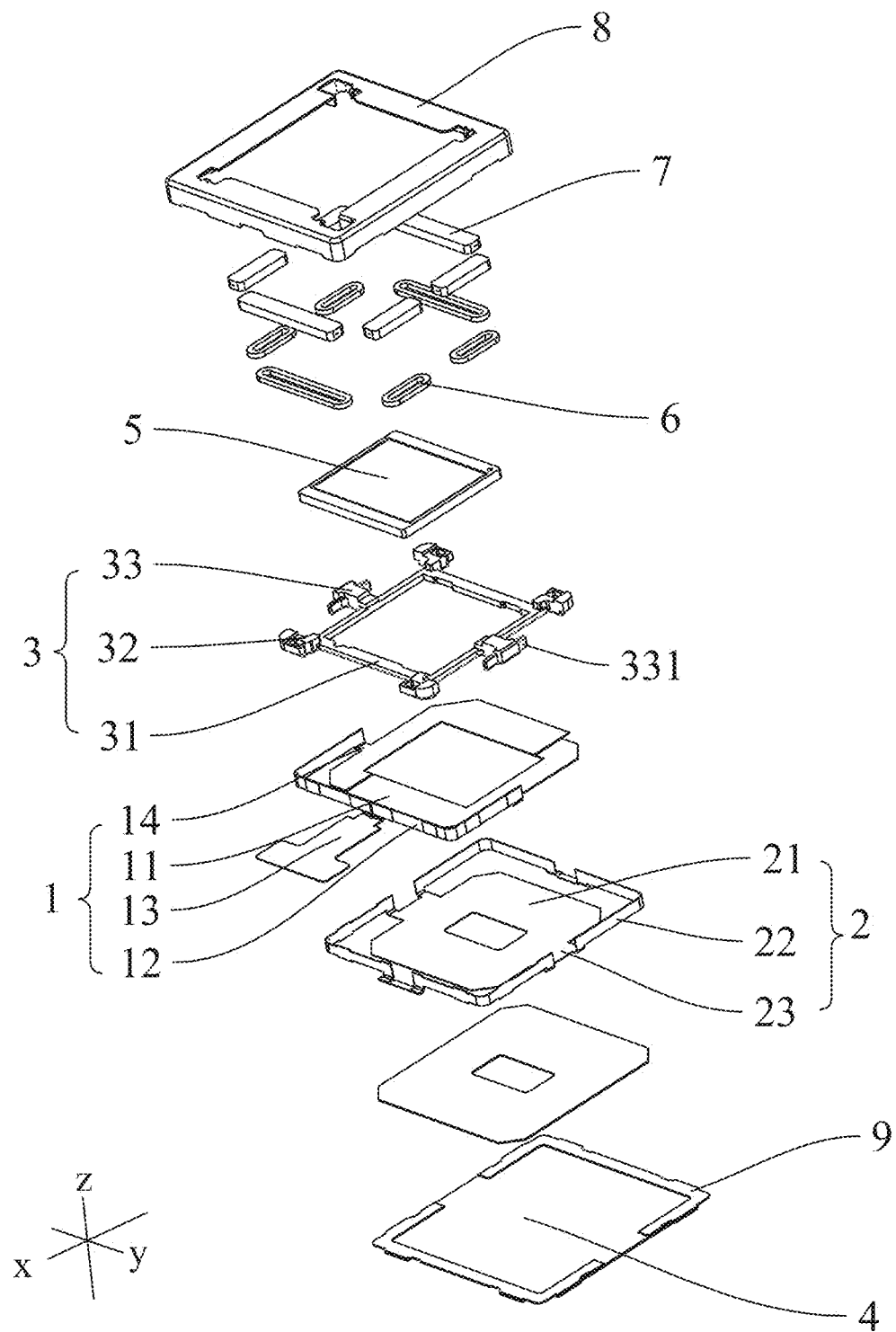
FIG. 2 shows an exploded view of the anti-shake mechanism of the present application.
Figure 3:
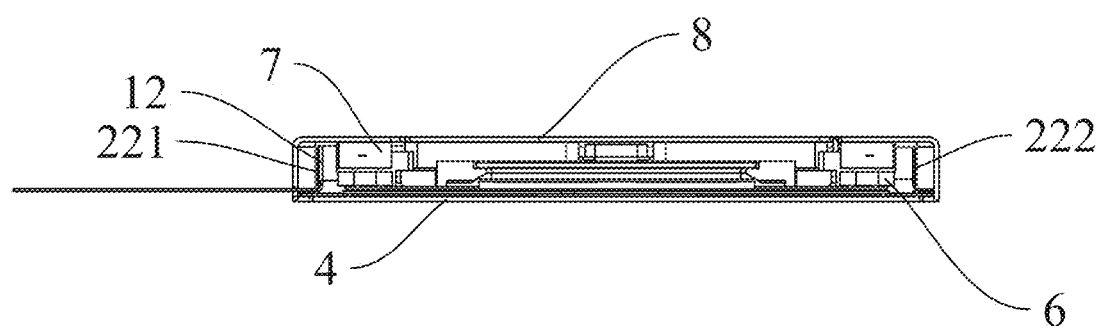
FIG. 3 shows a cross-sectional schematic diagram of the anti-shake mechanism of the present application.
Figure 4:
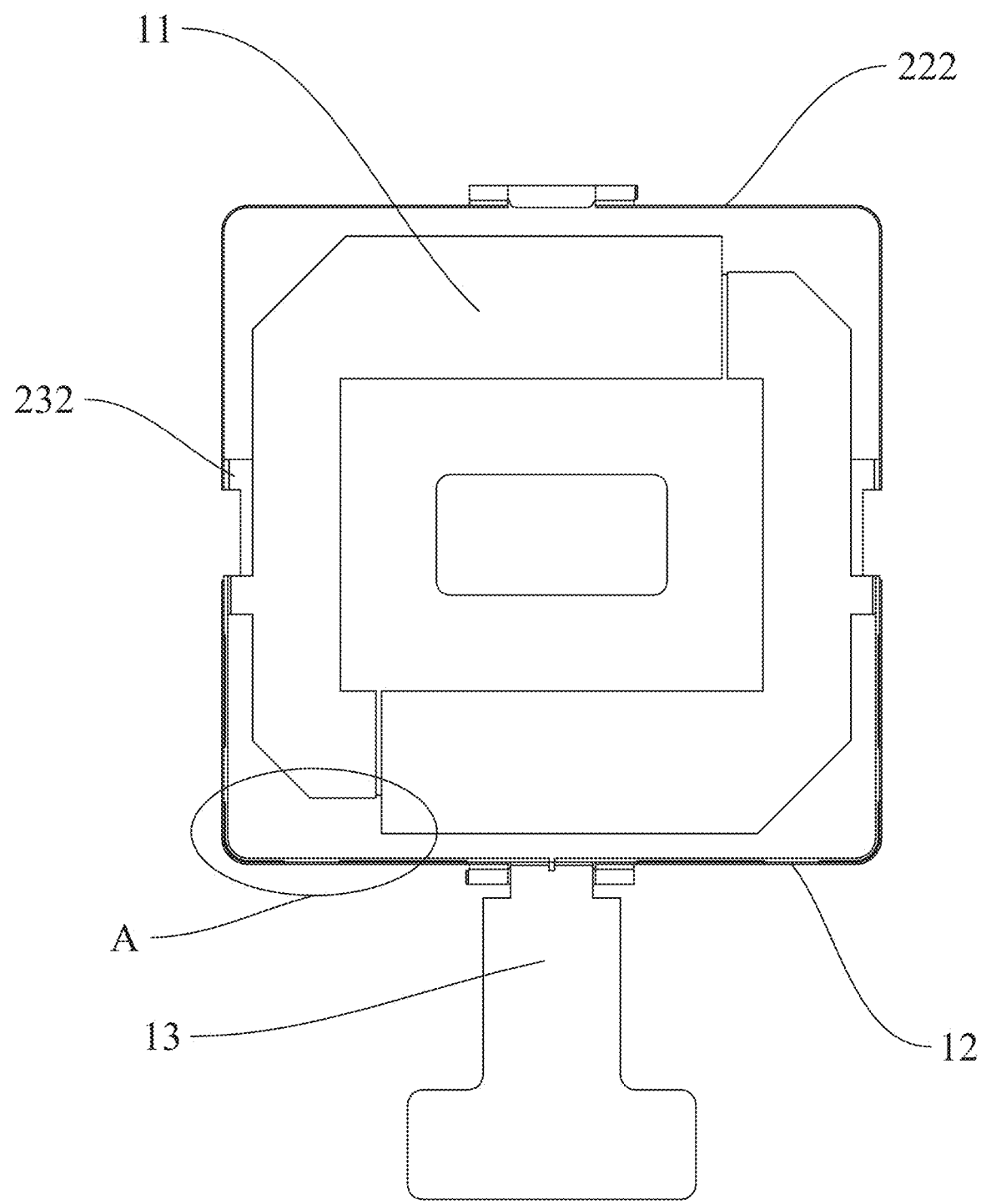
FIG. 4 is a structural schematic diagram showing the connection between the anti-shake circuit board and the flexible sheet.

In the figures, 1, anti-shake circuit board; 11, second main body; 12, second folded edge; 13, electrical connection portion; 14, second connecting block; 2, flexible sheet; 21, first main body; 22, first folded edge; 221, first segment; 222, second segment; 223, first notch; 224, second notch; 225, third notch; 226, third folded edge; 227, first connecting piece; 228, fourth folded edge; 229, second connecting piece; 23, first connecting block; 231, first connecting portion; 232, second connecting portion; 3, anti-shake bracket; 31, connecting ring; 32, first connecting arm; 33, second connecting arm; 331, connecting lug; 4, base plate; 5, image-sensing assembly; 6, anti-shake coil; 7, anti-shake magnetic steel; 8, casing; 9, spacer; 100, gap; and 200, flexible connection structure.

DETAILED DESCRIPTION OF THE EMBODIMENTS

The present application is further described below with reference to the accompanying drawings and embodiments.

In order to facilitate understanding of the present application, the application will be described more fully below with reference to the relevant accompanying drawings. The preferred embodiments of the present application are given in the accompanying drawings. However, the present application may be realized in many different forms and is not limited to the embodiments described herein. Rather, these embodiments are provided to enable a more thorough and comprehensive understanding of the disclosure of the present application.

When an element is considered to be "connected" to another element, it may be directly connected to the other element or there may be both centered elements. In this application, descriptions such as "first", "second", "third", "fourth" in the present application are for descriptive purposes only, and are not to be construed as indicating or implying their relative importance or implicitly specifying the number of technical features indicated.

It should be noted that in this embodiment, the x-direction, y-direction, and z-direction are spatially perpendicular to each other two by two, and the z-direction is parallel to the direction of an optical axis of the camera module.

Embodiment One

An embodiment of the present application discloses an anti-shake mechanism, as shown in FIGS. 1 to 4. The anti-shake mechanism includes an anti-shake circuit board 1 and a flexible sheet 2 arranged on the outer side of the anti-shake circuit board 1. The anti-shake circuit board 1 is partially overlapped with the flexible sheet 2, and the flexible sheet 2 is of an asymmetric structure. The flexible sheet 2 includes a first main body 21 and a first folded edge 22 arranged circumferentially around the first main body 21, and the first folded edge 22 is arranged perpendicular to a plane of the first main body 21. The anti-shake circuit board 1 includes a second main body 11, a second folded edge 12 arranged circumferentially around the second main body 11, and an electrically connected portion 13 arranged on the second folded edge 12. The second folded edge 12 is provided in correspondence with a part of the first folded edge 22. A stiffness compensation structure is provided on a region where the first folded edge 22 is not connected to the second folded edge 12, and a connecting region between the first folded edge 22 and the second folded edge 12 is at least partially adherent.

In an embodiment, the flexible sheet 2 is a metal elastic sheet.

The anti-shake mechanism of the present application includes an anti-shake circuit board 1 and a flexible sheet 2, and the anti-shake circuit board 1 and the flexible sheet 2 are partially overlapped, which reduces the volume of the anti-shake circuit board, and then the flexible sheet 2 is arranged as an asymmetric structure, and through the structural optimization of the anti-shake circuit board 1 and the flexible sheet 2 are structurally optimized, thereby ensuring the electrical connection role of the anti-shake circuit board 1 while simultaneously adjusting and optimizing the optical anti-shake performance. The flexible sheet 2 is matched with the shape of the anti-shake circuit board 1, which ensures the rigidity of the whole structure. The setup of the stiffness compensation structure further ensures the stability of the overall stability of the anti-shake mechanism as well as the stability of the anti-shake adjusting function. The first folded edge 22 and the second folded edge 12 are arranged vertically relative to a plane of the first main body 1 and a plane of the second main body 2, respectively. The first folded edge and the second folded edge are arranged in a three-dimensional folding structure, so that the anti-shake circuit board 1 and the flexible sheet 2 can be molded in a single pass during the part preparation process, thereby saving the etching process, simplifying the process of preparing parts, improving the assembly efficiency, and reducing the production cost. Besides, the folded edge structure of the flexible sheet 2 and the folded edge structure of the anti-shake circuit board 1 are arranged to meet the rigidity requirements in the x-direction, y-direction, and y-direction of the anti-shake circuit board and ensure that the stable support of the z-axis while guaranteeing the anti-shake stability in the x- and y-directions.

A gap 100 is provided between a connecting region between the first folded edge 22 and the second folded edge 12, and the gap 100 is at least partially filled with a flexible connecting structure to enable the connecting regions between the first folded edge and the second folded edge to be wholly or partially affixed to each other by the flexible connecting structure.

Figure 5:
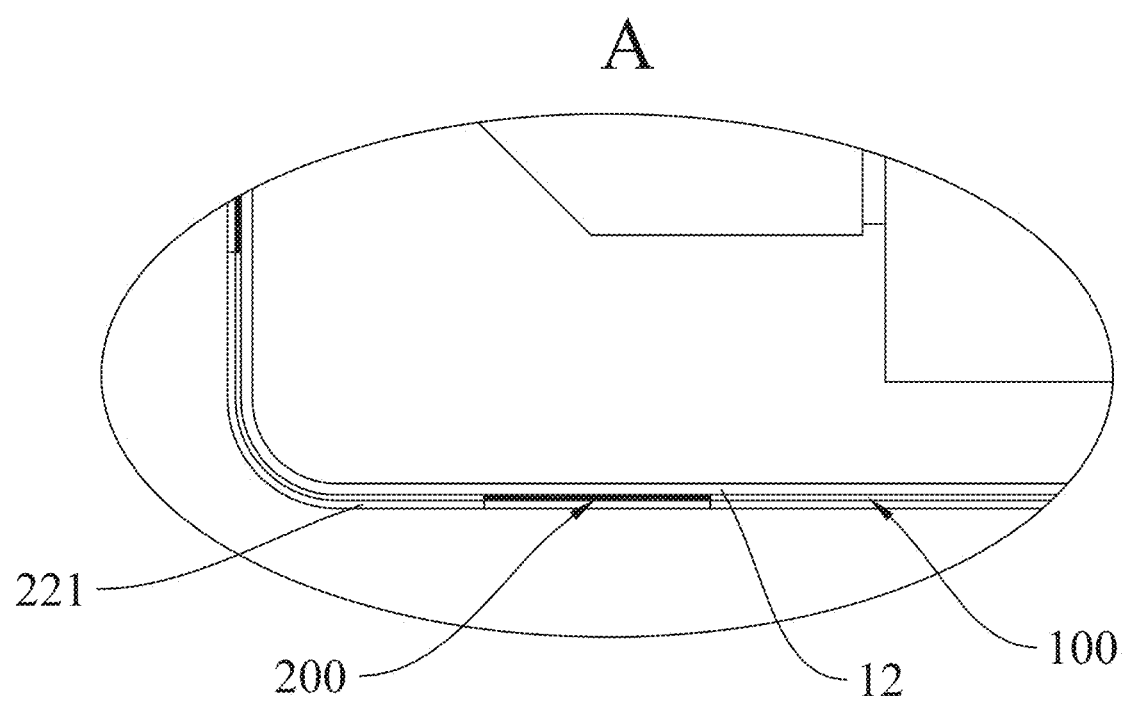
FIG. 5 shows an enlarged view at A in FIG. 4.

In some embodiments, the gap 100 is entirely filled with the flexible connecting structure to allow for a full fit of the connecting regions between the first folded edge and the second folded edge. Alternatively, as shown in FIG. 5, in other embodiments, the gap 100 is provided with a plurality of flexible connecting structures 200 spaced apart, and the flexible connecting structures 200 are uniformly distributed within the gap to allow for a partial fit between the first folded edge and the second folded edge.

Figure 6:
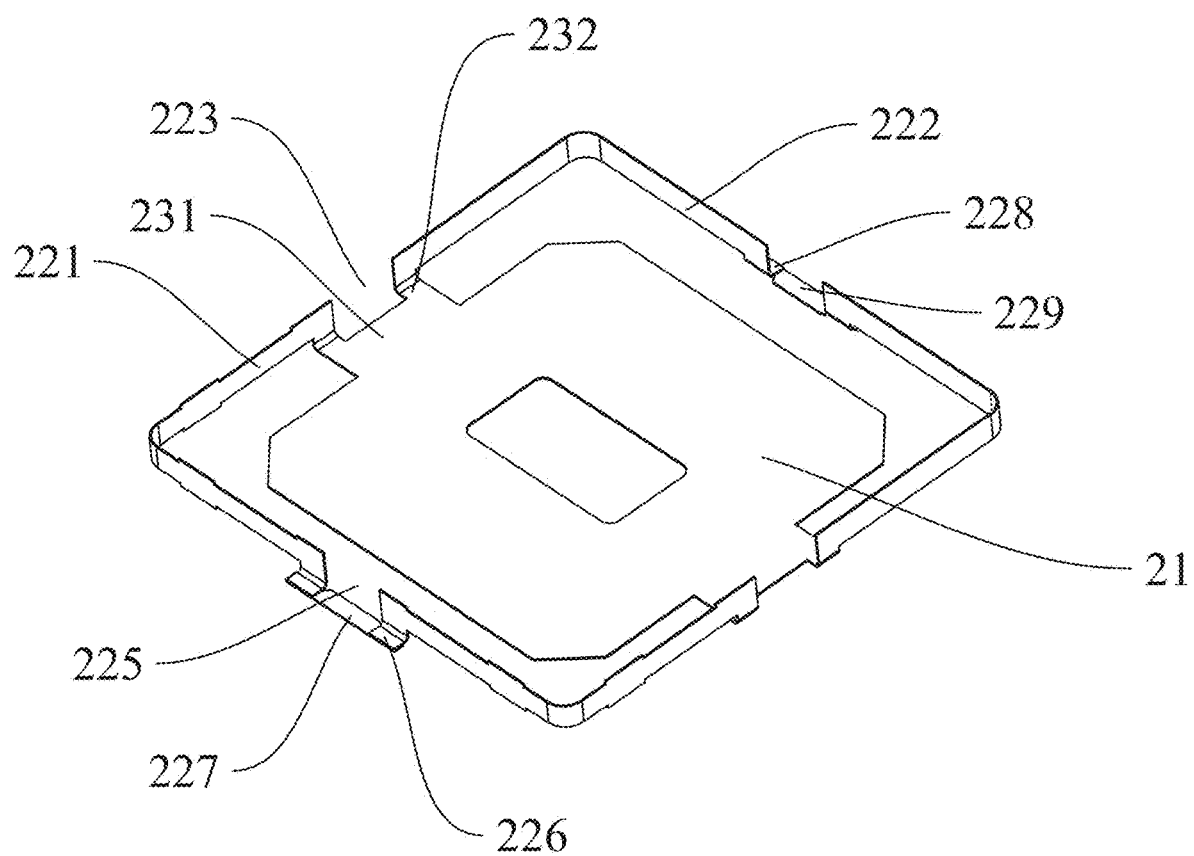
FIG. 6 is a structural schematic diagram of a flexible sheet.
Figure 7:
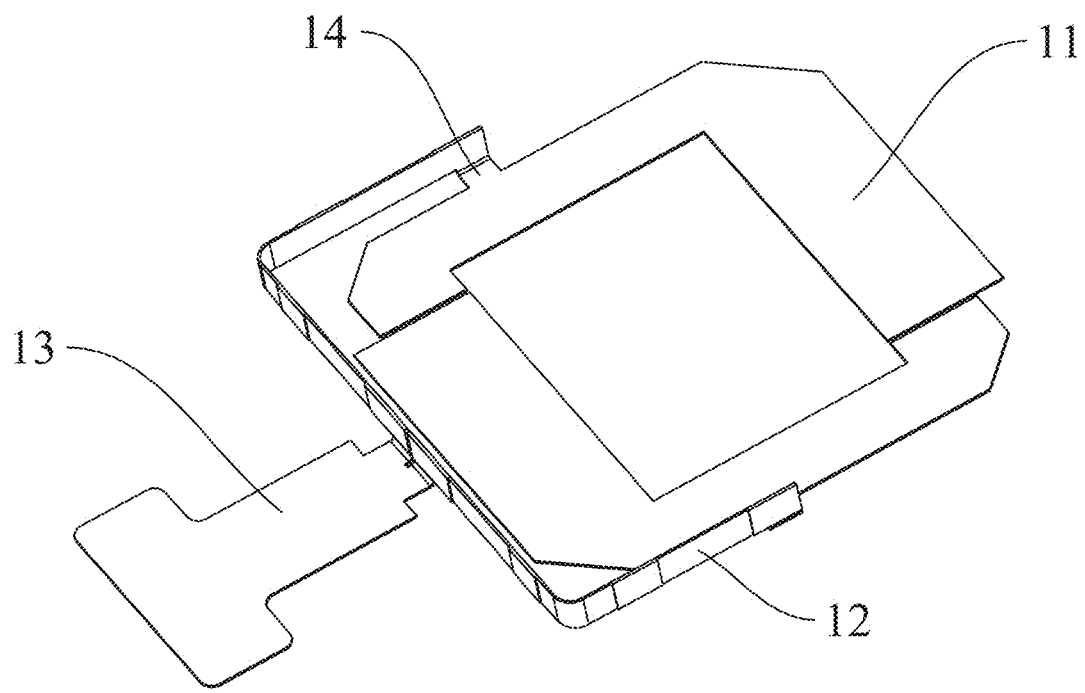
FIG. 7 is a structural schematic diagram of an anti-shake circuit board.
Figure 8:
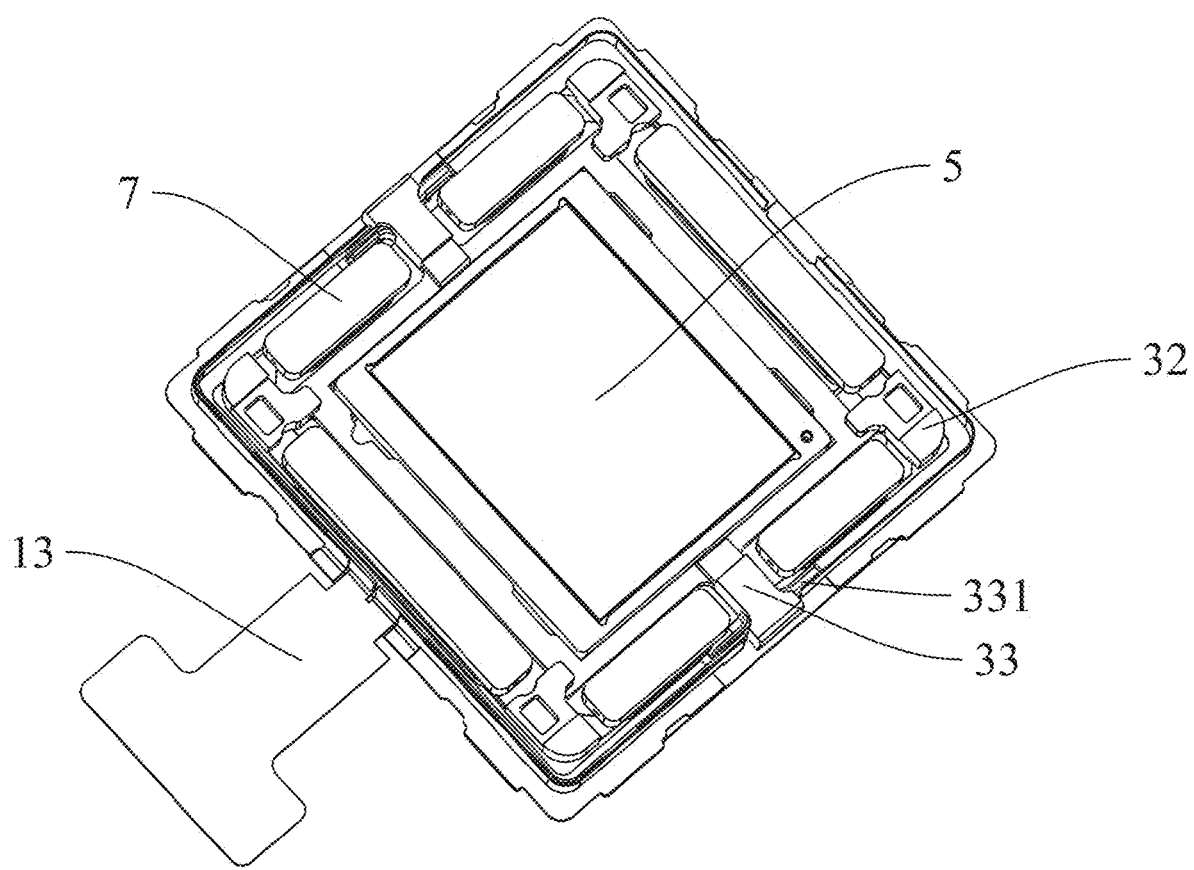
FIG. 8 shows a schematic diagram of an internal structure of the anti-shake mechanism of the present application.

As shown in FIG. 6, the flexible sheet 2 further includes first connecting blocks 23. The first connecting blocks 23 are symmetrically arranged on both sides of the first main body 21 and connected to the first folded edge 22. Specifically, the first connecting blocks 23 are symmetrically arranged along the x-direction. The anti-shake circuit board 1 further includes second connecting blocks 14. The second connecting blocks 14 are symmetrically arranged on both sides of the second main body 11 and connected to the second folded edge 12. The first connecting block 23 and the second connecting block 14 are provided correspondingly. In embodiments of the present application, the electrical connection 13 is provided along the y-direction.

In some embodiments, each first connecting block 23 includes a first connecting portion 231 connected to the first main body 21 and second connecting portions 232 connected to the first folded edge 22. Further, the second connecting portions 232 are symmetrically arranged on both sides of the first connecting portion 231, and separates the first folded edge 22 to form a first segment 221 and a second segment 222. A first notch 223 is formed in a spacing between the first segment 221 and the second segment 222. The second folded edge 12 is connected to the first segment 221, and a second notch 224 in a region of the first segment 221 corresponding to the electrical connection portion 13. A third notch 225 in a region of the second segment 222 corresponding to the second notch 224.

The width of the first connecting section 231 in the first connecting block 23 is greater than the width of each second connecting section 232, which ensures that there is a larger connecting region between the first connecting section 231 and the first main body 21, and in turn ensures the strength of the connection between the first connecting block 23 and the first main body 21, thereby avoiding damage to the connection area between the first connecting block 23 and the first main body 21 in the course of long-term use, and ensuring the durability of the flexible sheet 2.

The stiffness compensation structure is provided on a region of the first main body 21 away from the second folded edge 12, or on the second segment 222. Further, in some embodiments, the stiffness supplement structure is integrally molded with the first main body 21 or the second segment 222.

In some embodiments, the stiffness compensation structure is a first thickening structure arranged on the inside and/or outside of the second segment 222, i.e., the first thickening structure is provided such that the thickness along the x-direction of the second segment 222 is greater than the thickness along the x-direction of the first segment 221. In an embodiment, the first thickening structure is integrally molded into the second segment 222 or affixed to the second segment 222. Alternatively, in another embodiment, the stiffness compensation structure is a thickening structure provided on an upper surface and/or a lower surface of the second segment 222, i.e., the stiffness compensation structure is provided such that the maximum thickness of the second segment 222 along the z-direction is greater than the thickness of the first segment 221 along the z-direction. As an alternative, the thickening structure is integrally molded into the second segment 222 or affixed to the second segment 222. Alternatively, in other embodiments, the stiffness supplemental structure is a second thickening structure provided on a lower surface of a region of the first main body 21 away from the second folded edge 12; i.e., the second thickening structure is provided such that the thickness of the region of the first main body 21 away from the second folded edge 12 is greater than the thickness of the region of the first main body 21 close to the second folded edge 12. As an alternative, the second thickening structure is integrally molded into or affixed to a lower surface of the region of the first main body 21 away from the second folded edge 12.

An end portion at the second notch 224 is extended outwardly to form third folded edges 226 arranged parallel to the first main body 21. The third folded edges 226 are connected to each other through a first connecting piece 227, and the electrical connection portion 13 is connected to an upside of the first connecting piece 227. An end portion of the third notch 225 is extended outwardly to form fourth folded edges 228 arranged parallel to the first main body 21, and the fourth folded edges 228 are connected to each other through a second connecting piece 229. It is to be noted that the outward direction refers to a direction away from the center axis of the first main body 21.

As shown in FIGS. 1-3 and FIG. 8, the anti-shake mechanism further includes an anti-shake bracket 3, a base plate 4, an anti-shake coils 6, anti-shake magnetic steels 7, and a casing 8. The anti-shake bracket 3 is arranged in a region enclosed by the anti-shake circuit board 1 and the flexible sheet 2. The flexible sheet 2 is supported on the base plate 4, and the anti-shake coils 6 are arranged circumferentially around the anti-shake bracket 3. The anti-shake magnetic steels 7 are arranged above the corresponding anti-shake coils 6, and the casing 8 and the base plate 4 together form an accommodating space for accommodating the anti-shake circuit board 1, the flexible sheet 2, the anti-shake bracket 3, the anti-shake coils 6 and the anti-shake magnetic steels 7. The anti-shake coil 6 is provided on the anti-shake circuit board 1, and the anti-shake magnetic steel 7 is connected to the casing 8.

A spacer 9 is provided between the base plate 4 and the flexible sheet 2, the flexible sheet 2 is connected to the spacer 9, and the anti-shake bracket 3 is connected to the anti-shake circuit board 1. The anti-shake bracket 3 includes a connecting ring 31 arranged in a square shape, a first connecting arm 32 provided in a corner region of the connecting ring 31, and second connecting arms 33 symmetrically provided on both sides of the connecting ring 31. The second connecting arms 33 are arranged through the first notch 223. Each second connecting arm 33 is provided with connecting lugs 331 connected to the inner wall of the first folded edge 22 and the inner wall of the second folded edge 12. The spacer 9 is connected to the underside of the first connecting piece 227 and the underside of the second connecting piece 229, in order to securely support the combined structure of the flexible sheet 2 and the anti-shake circuit board 1. Specifically, the second connecting arm 33 is provided along the y-direction, and the connecting lugs 331 are symmetrically provided on both sides of the second connecting arm 33. The upper refers to a direction away from the base plate 4, and the lower refers to a direction close to the base plate 4.

Embodiments of the present application also disclose a camera module, which includes an anti-shake mechanism as described above and an image-sensing assembly 5. The image-sensing assembly 5 is arranged in a region enclosed by the anti-shake circuit board 1 and the anti-shake bracket 3.

A first hole is provided in the center region of the first main body 21, and a second hole is provided in the center region of the second main body 11. The image-sensing assembly 5 is arranged on the second main body 11, and the first hole is configured to dissipate heat from the image-sensing assembly 5. In an embodiment, the first hole and the second hole are coaxially arranged. A third hole is provided on the top of the casing 8 in a region corresponding to the anti-shake bracket 3.

During anti-shake adjustment, the anti-shake mechanism drives the image-sensing assembly 5 to move to supplement the displacement due to shaking so as to obtain a clear image. The anti-shake mechanism of the present application optimizes the overall stiffness of the anti-shake mechanism by the structural optimization of the anti-shake circuit board 1 and the flexible sheet 2, which enhances support force in the z-direction while effectively resisting the tractive force in the x-direction or y-direction, thereby enhancing the optical anti-shake adjustment stability and the image effect of the camera module.

Described above are only embodiments of the present application, and it should be pointed out that, for the ordinary technical personnel in the field, improvements may also be made without departing from the premise of the concept of the present application, but these are all within the protection scope of the present application.

What is claimed is:

1. An anti-shake mechanism, comprising:
   an anti-shake circuit board comprising:
      a second main body;
      a second folded edge arranged circumferentially around the second main body; and
      an electrical connection portion provided on the second folded edge; and
   a flexible sheet arranged outside the anti-shake circuit board, the anti-shake circuit board and the flexible sheet partially overlapping each other, the flexible sheet being of an asymmetric structure; the flexible sheet comprising:
      a first main body; and
      a first folded edge arranged circumferentially around the first main body;
   wherein the first folded edge is arranged perpendicular to a plane of the first main body; the second folded edge is provided in correspondence with a part of the first folded edge; a stiffness compensation structure is provided on a region where the first folded edge is not connected to the second folded edge, and a connecting region between the first folded edge and the second folded edge is at least partially adherent.

2. The anti-shake mechanism of claim 1, wherein a gap is provided between the connecting region between the first folded edge and the second folded edge, and the gap is at least partially filled with a flexible connection structure.

3. The anti-shake mechanism of claim 2, wherein the gap is entirely filled with a flexible connecting structure; or, the gap is provided with a plurality of flexible connecting structures spaced apart, and the flexible connecting structures are uniformly distributed within the gap.

4. The anti-shake mechanism of claim 1, wherein the flexible sheet further comprises first connecting blocks, the first connecting blocks being symmetrically arranged on both sides of the first main body and connected to the first folded edge; the anti-shake circuit board further comprises second connecting blocks, the second connecting block being symmetrically arranged on both sides of the second main body and connected to the second folded edge; the first connecting blocks the second connecting blocks are provided correspondingly.

5. The anti-shake mechanism of claim 4, wherein each of the first connecting blocks comprises a first connecting portion connected to the first main body and second connecting portions connected to the first folded edge; the second connecting portions are symmetrically arranged on both sides of the first connecting portion, and separate the first folded edge to form a first segment and a second segment; a first notch is formed in a spacing between the first segment and the second segment, and the second folded edge is connected to the first segment; a second notch is provided on a region of the first segment corresponding to the electrical connection portion, and a third notch is provided on a region of the second segment corresponding to the second notch.

6. The anti-shake mechanism of claim 5, wherein the stiffness compensation structure is provided on a region of the first main body away from the second folded edge, or on the second segment.

7. The anti-shake mechanism of claim 6, wherein the stiffness compensation structure is a first thickening structure arranged on an inner and/or outer side of the second segment; or, the stiffness compensation structure is a thickening structure arranged on an upper surface and/or a lower surface of the second segment; or, the stiffness compensation structure is a second thickening structure arranged on a lower surface of a region of the first main body away from the second folded edge.

8. The anti-shake mechanism of claim 5, wherein an end portion of the second notch is extended outwardly to form third folded edges arranged parallel to the first main body; the third folded edges are connected to each other through a first connecting piece, and the electrical connection portion is connected to an upside of the first connecting piece; an end portion of the third notch is extended outwardly to form fourth folded edges arranged parallel to the first main body, and the fourth folded edge connected to each other through a second connecting piece.

9. The anti-shake mechanism of claim 5, further comprising an anti-shake bracket, a base plate, anti-shake coils, anti-shake magnetic steels, and a casing; wherein the anti-shake bracket is arranged in a region enclosed by the anti-shake circuit board and the flexible sheet; the flexible sheet is supported on the base plate, and the anti-shake coils are distributed circumferentially around the anti-shake bracket; the anti-shake magnetic steels are arranged above the corresponding anti-shake coils, and the casing and the base plate together form an accommodating space for accommodating the anti-shake circuit board, the flexible sheet, the anti-shake bracket, the anti-shake coils, and the anti-shake magnetic steels.

10. The anti-shake mechanism of claim 9, wherein a spacer is provided between the base plate and the flexible sheet, and the flexible sheet is connected to the spacer; the anti-shake bracket is connected to the anti-shake circuit board, and the anti-shake bracket comprises a connecting ring arranged in a square shape, a first connecting arm arranged at a corner region of the connecting ring, and second connecting arms arranged symmetrically on both sides of the connecting ring; each of the second connecting arms is provided with connecting lugs connected to an inner wall of the first folded edge and an inner wall of the second folded edge; and the spacer is connected to a bottom side of the first connecting piece and a bottom side of the second connecting piece.

11. A camera module, comprising:
an anti-shake mechanism of claim 1; and
an image-sensing assembly;
wherein the image-sensing assembly is arranged in a region enclosed by the anti-shake circuit board and the anti-shake bracket.

* * * * *